June 10, 1947. L. W. GERMANY 2,421,931
AUTOMATIC STARTING ARRANGEMENT FOR SYNCHRONOUS MOTORS
Filed June 30, 1945
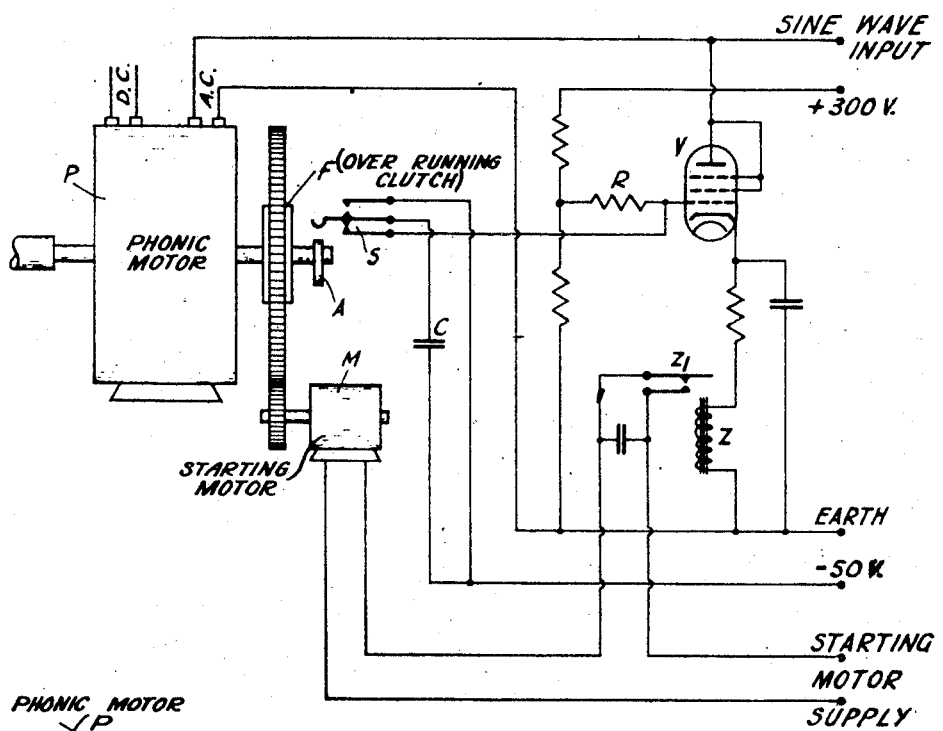
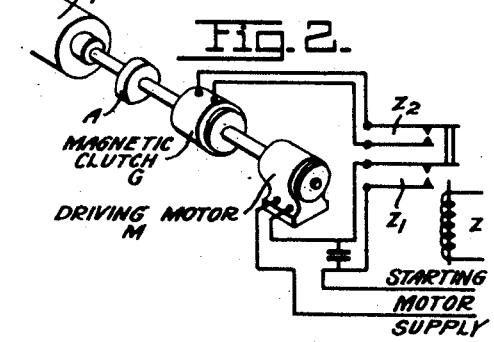
Leslie Walter Germany
Inventor Patented June 10, 1947

2,421,931

UNITED STATES PATENT OFFICE 2,421,931

AUTOMATIC STARTING ARRANGEMENT FOR SYNCHRONOUS MOTORS

Leslie W. Germany, Cambridge, England, assignor to Pye Limited, Cambridge, England, a British company Application June 30, 1945, Serial No. 602,598
In Great Britain March 30, 1944

7 Claims. (Cl. 172—289)

1

The present invention relates to an automatic starting arrangement for synchronous motors, and particularly phonic motors which require auxiliary means to bring them to their correct working speed after the application of the driving waveform.

According to the present invention, a part of the alternating current or driving waveform for driving the synchronous motor is rectified by a rectifier, the rectified output being used to control the operation of a starting motor which is coupled through a clutch mechanism, such as an over-running clutch or the like, to drive the synchronous motor, the rectifier being biassed, upon starting, to such a conducting portion of its characteristic that the rectified output will start the starting motor, and means operated in accordance with the speed of the synchronous motor being provided for changing the bias on the rectifier to a less conducting portion of its characteristic such that, when the synchronous motor attains its correct operating speed, the rectified output is reduced to such a low value that the starting motor is stopped.

Preferably, the bias is changed to shift the operating point of the rectifier to a non-conducting portion of its characteristic when the synchronous motor attains its correct operating speed. A feature of the invention therefore consists in an automatic starting arrangement for synchronous motors, wherein the alternating current or driving waveform is rectified, the rectified output being fed to control a starting motor which is coupled through an over-running clutch or like mechanism to the synchronous motor, means being provided operated from the synchronous motor to bias the rectifier to a non-conducting portion of its characteristic when the synchronous motor attains its correct operating speed and thus to cut off the current supply to the starting motor.

In a preferred embodiment of the invention the bias for the rectifying device is produced by charging up an electric condenser which is periodically discharged by means coupled to the shaft of the synchronous motor whereby, when the synchronous motor is running at its correct working speed, the condenser is discharged at such rapid intervals that it cannot attain a sufficiently high charge to bias the rectifier to a conducting portion of its characteritsic so that, when this speed is attained, the rectifier ceases to conduct and the starting motor stops. The rectifier may conveniently comprise a thermionic valve having the

2 biassing potential applied to a control electrode thereof.

In order that the invention may be more clearly understood, two embodiments thereof will now be described by way of example, with reference to Figs. 1 and 2 of the accompanying drawings, which show circuit arrangements according to the invention for starting a phonic motor which has to be driven by a sine wave input.

Referring to Fig. 1 of the drawings, the auxiliary means to bring the phonic motor to its correct working speed after the application of the driving waveform comprises a separate starting motor M suitably geared to the phonic motor P and coupled thereto by a free wheel mechanism F. The sine wave input for driving the phonic motor is rectified by the valve V which has a relay Z connected in its cathode lead. When the relay Z operates it closes its contacts Z1 to complete the circuit for the starting motor M which is capable of driving the phonic motor P to a speed slightly higher than its normal running speed.

As soon as the phonic motor attains its normal running speed the valve V is rendered non-conducting due to the rapid operation of the switch. This is a single changeover switch operated by a cam A mounted on the shaft of the phonic motor. A condenser C which is connected to a voltage which is negative to the cathode is normally connected through the switch S to the grid of the valve V which, in turn, is connected through a high resistance R to a source of positive potential. When the switch is operated by the cam, the condenser is disconnected from the grid, thus, allowing the grid to go positive, and the condenser is short circuited at the upper contact of the switch S. Consequently when the switch S is again released by the cam and closes its lower contacts the grid is made to go negative and the valve is cut off until the condenser is recharged. The charging time is governed by the values of the condenser C and the resistance R, and if the operating frequency of the switch is such that the condenser does not become sufficiently charged to make the valve conducting before the condenser is again short circuited, then the starting motor will not operate. So long, however, as the shaft speed of the phonic motor is below its correct operating speed, then the condenser C will charge to a value which renders the valve conducting whereby the relay Z is operated and the starting motor runs until the correct operating speed of the phonic motor is reached when, as previously explained, the relay Z will be de-energised and the starting motor will cease to operate.

A smoothing circuit is connected across the relay coil to prevent chatter when the grid of the valve goes positive for a short period on every revolution of the phonic motor spindle. This also has the advantage that it delays the release of the relay slightly when the phonic motor has attained its running speed, thus allowing the phonic motor to reach a speed slightly higher than its running speed.

It will be clear that the starting motor only operates so long as the sine wave input to the phonic motor is available.

Although a particular embodiment has been described by way of example, it will be understood that various modifications may be made without departing from the spirit of the invention. For example, instead of a free wheel device or over-running clutch, a magnetic clutch G, Fig. 2 may be used to couple the starting motor to the phonic motor, in which case two sets of contacts would be provided on the relay Z, one set 31 for operating the starting motor and the other set 32 for engaging the magnetic clutch. The circuit of Fig. 2 is otherwise the same as in Fig. 1.

The starting arrangement according to the invention may be usefully employed with the apparatus described in the specifications of copending applications Serial No. 530,189 of William Jones filed April 8, 1944, and Serial No. 549,535 of William Jones filed August 15, 1944.

I claim:

1. Automatic starting arrangement for synchronous motors, comprising a synchronous motor, a starting motor, means comprising a clutch mechanism for driving the synchronous motor by the starting motor, means for feeding a driving waveform to the synchronous motor, a rectifier for rectifying a proportion of the driving waveform, means actuated by the rectifier output for operating the starting motor, means for biassing the rectifier upon starting to such a conducting portion of its characteristic that the rectified output will start the starting motor, and means operated in accordance with the speed of the synchronous motor for changing the bias on the rectifier to a less conducting portion of its characteristic such that, when the synchronous motor attains its correct operating speed, the rectified output is reduced to such a low value that the starting motor is stopped and the clutch mechanism disengaged.

2. Automatic starting arrangement for synchronous motors comprising a synchronous motor, a starting motor, means comprising an over-running clutch for driving the synchronous motor by the starting motor, means for feeding a driving waveform to the synchronous motor, a rectifier for rectifying a proportion of the driving waveform, means actuated by the rectifier output for operating the starting motor, means for biassing the rectifier upon starting to such a conducting portion of its characteristic that the rectified output will start the starting motor, and means operated in accordance with the speed of the synchronous motor for changing the bias on the rectifier such that, when the synchronous motor attains its correct operating speed, the rectifier is biassed to a non-conducting portion of its characteristic and ceases to conduct and the starting motor is stopped.

3. Automatic starting arrangement for phonic motors, comprising a phonic motor, a starting motor, means comprising clutch mechanism for driving the phonic motor by the starting motor, means for feeding a driving waveform to the phonic motor, a rectifier for rectifying a proportion of the driving waveform, a relay for controlling the operation of the starting motor which is actuated by the rectified output from the rectifier, means for biassing the rectifier upon starting to such a conducting portion of its characteristic that the rectified output will actuate the relay to start the starting motor, and means operated in accordance with the speed of the phonic motor for changing the bias on the rectifier to a less conducting portion of its characteristic such that, when the phonic motor attains its correct operating speed, the rectified output is reduced to such a low value that the relay falls off, the starting motor is stopped and the clutch mechanism disengaged.

4. Automatic starting arrangement for synchronous motors, comprising a synchronous motor, a starting motor, means comprising a clutch mechanism for driving the synchronous motor by the starting motor, means for feeding a driving waveform to the synchronous motor, a rectifier for rectifying a proportion of the driving waveform, means actuated by the rectifier output for operating the starting motor, an electric condenser for biassing the rectifier to various portions of its characteristic, means for charging the condenser to such a potential when the synchronous motor is stationary that the rectifier operates on such a conducting portion of its characteristic that the rectified output will start the starting motor, and means operated in accordance with the speed of the synchronous motor for periodically discharging the condenser such that, when the synchronous motor is running at its correct operating speed, the condenser is discharged at such rapid intervals that it cannot attain a sufficiently high charge to bias the rectifier to a conducting portion of its characteristic whereby upon this speed being attained, the rectifier ceases to conduct, the starting motor is stopped and the clutch mechanism disengaged.

5. Automatic starting arrangement for synchronous motors, comprising a synchronous motor, a starting motor, means comprising an over-running clutch for driving the synchronous motor by the starting motor, means for feeding a driving waveform to the synchronous motor, a rectifier for rectifying a proportion of the driving waveform, a relay for controlling the operation of the starting motor which is actuated by the rectified output from the rectifier, an electric condenser for biassing the rectifier to various portions of its characteristic, means for charging the condenser to such a potential when the synchronous motor is stationary that the rectifier operates on such a conducting portion of its characteristic that the rectified output will actuate the relay to start the starting motor, and means operated by the speed of the synchronous motor for periodically discharging the condenser such that, when the synchronous motor is running at its correct operating speed, the condenser is discharged at such rapid intervals that it cannot attain a sufficiently high charge to bias the rectifier to a sufficiently conducting portion of its characteristic to maintain the relay actuated whereby, upon this speed being attained, the rectified output is reduced to such a low value that the relay falls off and the starting motor is stopped.

6. Automatic starting arrangement for synchronous motors, comprising a synchronous motor, a starting motor, means comprising an over-running clutch for driving the synchronous motor by the starting motor, means for feeding a driving waveform to the synchronous motor, a thermionic valve for rectifying a proportion of the driving waveform, a relay for controlling the operation of the starting motor which is connected in the cathode lead of the valve and is actuated by the rectified output therefrom, an electric condenser for applying a biassing potential to a control electrode of the rectifier valve, means for charging the condenser to such a potential when the synchronous motor is stationary that the rectifier valve operates on such a conducting portion of its characteristic that the rectified output will actuate the relay to start the starting motor, and means operated by the speed of the synchronous motor for periodically discharging the condenser such that, when the synchronous motor is running at its correct operating speed, the condenser is discharged at such rapid intervals that it cannot attain a sufficiently high charge to bias the rectifier valve to a sufficiently conducting portion of its characteristic to maintain the relay actuated whereby, upon this speed being attained, the rectified output is reduced to such a low value that the relay falls off and the starting motor is stopped.

7. Automatic starting arrangement for synchronous motors, comprising a synchronous motor, a starting motor, means comprising an overrunning clutch for driving the synchronous motor by the starting motor, means for feeding a driving waveform to the synchronous motor, a thermionic valve for rectifying a proportion of the driving waveform, a relay for controlling the operation of the starting motor which is connected in the cathode lead of the valve and is actuated by the rectified output therefrom, an electric condenser for applying a biassing potential to a control electrode of the rectifier valve, said electrode being connected through a high resistance to a source of postive potential, a switch periodically operated by the rotation of the synchronous motor so as alternately to connect one plate of the condenser to the said control electrode of the rectifier valve and the other plate of the condenser to a source of negative potential whereby, when the synchronous motor is stationary, the rectifier valve will operate on such a conducting portion of its characteristic that the rectified output will actuate the relay to start the starting motor while, when the synchronous motor is running at its correct operating speed, the condenser is discharged at such rapid intervals that it cannot attain a sufficiently high charge to bias the rectifier valve to a sufficiently conducting portion of its characteristic to maintain the relay actuated whereby, upon this speed being attained, the rectified output is reduced to such a low value that the relay falls off and the starting motor is stopped.

LESLIE W. GERMANY.

REFERENCES CITED

The following references are of record in the file of this patent:

UNITED STATES PATENTS

| Number | Name | Date |
|---|---|---|
| 485,659 | Rice | Nov. 8, 1892 |
| 1,533,277 | Slepian | Apr. 14, 1925 |

FOREIGN PATENTS

| Number | Country | Date |
|---|---|---|
| 12,275 | Australia | 1933 |